US011125601B2

(12) United States Patent
Ziegler et al.

(10) Patent No.: US 11,125,601 B2
(45) Date of Patent: Sep. 21, 2021

(54) LABORATORY AUTOMATION SYSTEM INCLUDING IMPROVED PROCESSING OF A LABORATORY SAMPLE BY OPTICAL AND TIP POSITION SENSING

(71) Applicant: Roche Diagnostics Operations, Inc., Indianapolis, IN (US)

(72) Inventors: Guenter Ziegler, Polling (DE); Oliver Larbolette, Penzberg (DE); Rolf Herb, Weilheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 95 days.

(21) Appl. No.: 16/226,889

(22) Filed: Dec. 20, 2018

(65) Prior Publication Data
US 2019/0120682 A1  Apr. 25, 2019

Related U.S. Application Data

(63) Continuation of application No. PCT/EP2017/067151, filed on Jul. 7, 2017.

(30) Foreign Application Priority Data

Jul. 8, 2016  (EP) .................................. 16178576

(51) Int. Cl.
*G01F 23/292* (2006.01)
*G01F 23/14* (2006.01)
(Continued)

(52) U.S. Cl.
CPC .......... *G01F 23/2921* (2013.01); *G01F 23/14* (2013.01); *G01F 23/245* (2013.01);
(Continued)

(58) Field of Classification Search
None
See application file for complete search history.

(56) References Cited

U.S. PATENT DOCUMENTS

| 4,873,875 A | 10/1989 | Cork |
| 5,648,727 A | 7/1997 | Tyberg et al. |
| (Continued) | | |

FOREIGN PATENT DOCUMENTS

| CN | 102095473 A | 6/2011 |
| CN | 104121965 A | 10/2014 |
| (Continued) | | |

OTHER PUBLICATIONS

International Search Report dated Nov. 16, 2017, in Application No. PCT/EP2017/067151, 3 pp.

*Primary Examiner* — Lisa M Caputo
*Assistant Examiner* — Nigel H Plumb
(74) *Attorney, Agent, or Firm* — Roche Diagnostics Operations, Inc.

(57) ABSTRACT

An apparatus for processing a laboratory sample contained in a laboratory sample container is presented. The apparatus comprises an optical sensing unit for sensing a transmittance at different vertical positions through the laboratory sample container and a tip sensing unit having a tip. The tip sensing unit is adapted to provide a tip sensing signal (tLDS) depending on a position of the tip relative to the sample. The apparatus also comprises a process control unit adapted to control the secure and reliable pipetting of the laboratory sample in response to both the transmittance and the tip sensing signal (tLDS) provided by the tip sensing unit.

7 Claims, 2 Drawing Sheets

(51) Int. Cl.
    *G01F 23/24*         (2006.01)
    *G01F 23/26*         (2006.01)
    *G01N 35/10*         (2006.01)

(52) U.S. Cl.
    CPC ....... *G01F 23/263* (2013.01); *G01N 35/1009* (2013.01); *G01N 2035/1018* (2013.01); *G01N 2035/1025* (2013.01)

(56) References Cited

U.S. PATENT DOCUMENTS

| | | |
|---|---|---|
| 2013/0065797 A1 | 3/2013 | Silbert et al. |
| 2014/0036276 A1 | 2/2014 | Gross et al. |
| 2014/0231680 A1 | 8/2014 | Klinec |
| 2016/0018427 A1 | 1/2016 | Streibl et al. |
| 2016/0025546 A1 | 1/2016 | Ott et al. |

FOREIGN PATENT DOCUMENTS

| | | |
|---|---|---|
| EP | 2293029 A1 | 3/2011 |
| EP | 2770317 A1 | 8/2014 |
| JP | 2000-193670 A | 7/2000 |
| JP | 2007-322285 A | 12/2007 |
| JP | 2009-174869 A | 8/2009 |
| JP | 2010-197047 A | 9/2010 |
| JP | 2010-216956 A | 9/2010 |
| JP | 2014-6094 A | 1/2014 |
| JP | 2016-027309 A | 2/2016 |
| WO | 2003/023370 A2 | 3/2003 |
| WO | 2013/042405 A1 | 3/2013 |
| WO | 2015/056649 A1 | 4/2015 |

LABORATORY AUTOMATION SYSTEM INCLUDING IMPROVED PROCESSING OF A LABORATORY SAMPLE BY OPTICAL AND TIP POSITION SENSING

CROSS-REFERENCE TO RELATED APPLICATIONS

This application is a continuation of PCT/EP2017/067151, filed Jul. 7, 2017, which is based on and claims priority to EP 16178576.1, filed Jul. 8, 2016, which is hereby incorporated by reference.

BACKGROUND

The present disclosure relates to an apparatus for processing a laboratory sample contained in a laboratory sample container, to a laboratory automation system comprising such an apparatus and to a method for pipetting a laboratory sample.

SUMMARY

According to the present disclosure, an apparatus for processing a laboratory sample contained in a laboratory sample container is presented. The apparatus can comprise an optical sensing unit for sensing a transmittance at different vertical positions through the laboratory sample container and a tip sensing unit having a tip. The tip sensing unit can be adapted to provide a tip sensing signal (tLDS) depending on a position of the tip relative to the sample. The apparatus can also comprise a process control unit adapted to control the processing of the laboratory sample in response to the transmittance and the tip sensing signal (tLDS).

Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
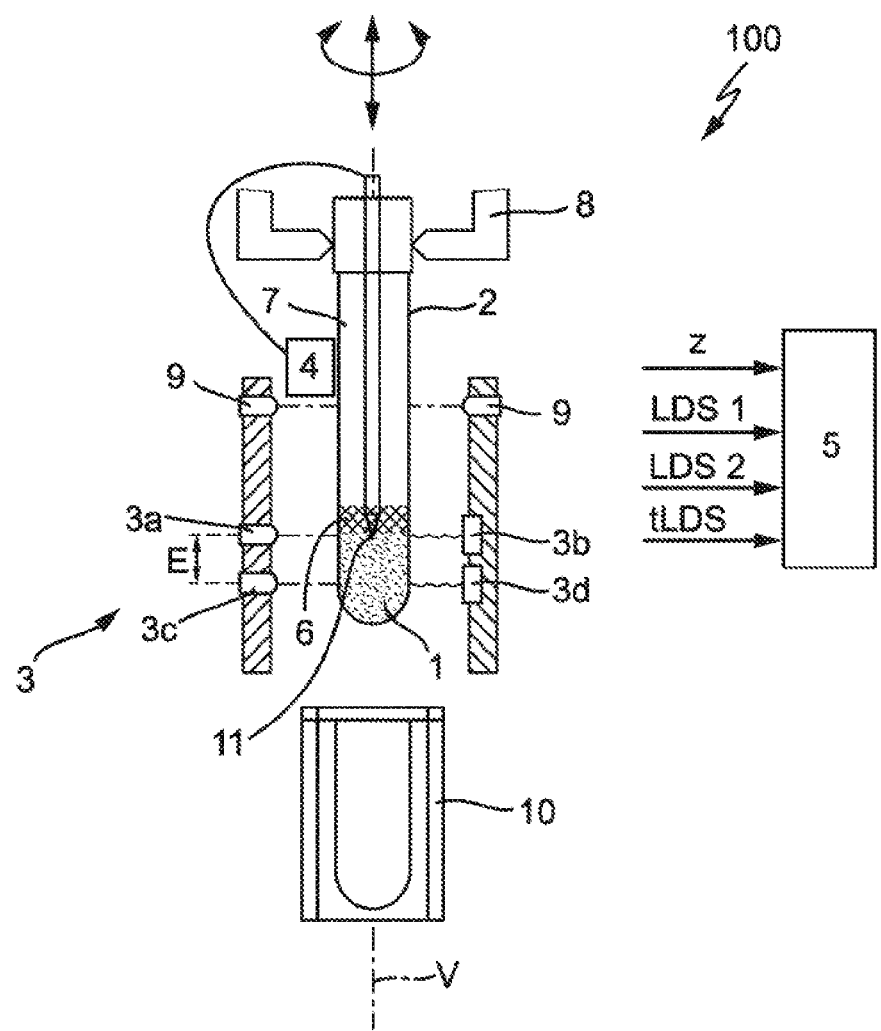
FIG. 1 illustrates schematically an apparatus for processing a laboratory sample contained in a laboratory sample container according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

An apparatus is presented. The apparatus can be adapted to process such as, for example, pipette, a laboratory sample contained in a laboratory sample container.

The apparatus can comprise an optical sensing unit. The optical sensing unit can be adapted to sense an (optical power) transmittance (also called transmission) through the laboratory sample container. Transmittance typically can be defined as the ratio of the optical power of the transmitted light exiting the laboratory sample container after having passed through the laboratory sample container comprising the laboratory sample to the incident optical power of light applied to the sample container. Transmittance can typically be a numerical value between zero, i.e. all light is absorbed, and one, i.e. no light is absorbed. Regarding the term transmittance, reference is also made to the relevant technical literature. In the following, transmittance can be defined as the ratio between the optical power detected by a respective light detector to the optical power emitted by a respective light source.

The apparatus may further comprise a tip sensing unit comprising a tip such as, for example, a pipetting tip. The tip sensing unit can be adapted to provide a tip sensing signal depending on a position such as, for example, a vertical position, of the tip relative to the sample. The tip sensing signal may be representative regarding a liquid level of the laboratory sample inside the laboratory sample container. The tip sensing unit may, for example, comprise a resistive sensing unit rLLD measuring a tip resistance, a capacitive sensing unit cLLD measuring a tip position dependent capacitance, and/or a pressure based liquid sensing unit pLLD, each providing the tip sensing signal, inter alia, dependent on a liquid level of the laboratory sample inside the laboratory sample container.

The optical sensing unit may comprise an array or any suitable arrangement of a plurality of corresponding sensing elements, for example, arranged vertically spaced. The optical sensing unit may, for example, comprise two optical sender diodes and two corresponding receiver diodes.

The apparatus can further comprise a process control unit, for example, in the form of a personal computer (PC) or any other type of processor. The process control unit can be adapted to control the processing of the laboratory sample in response to the transmittance and/or in response to further sensing signals being representative of the liquid level of the laboratory sample provided by the further sensing units such as, for example, in response to the tip sensing signal.

The process control unit may initiate and/or control the processing of the laboratory sample in response to the transmittance and in response to the further sensing signals, in particular in response to the tip sensing signal.

The laboratory sample container can typically be designed as a tube made of glass or transparent plastic and typically can have an opening at an upper end. The laboratory sample container may be used to contain, store and transport the laboratory sample such as a blood sample, (blood) serum or plasma sample, a urine sample, separation gel, cruor (blood cells) or a chemical sample. Some parts of the sample may occur in a distance of the liquid level in the laboratory sample container during sample preparation as foam, a liquid film or droplets, in particular by manual and/or automatic pipetting, by transporting the laboratory sample container between different laboratory stations, by handling the laboratory sample container, by capping/decapping or by shaking the laboratory sample container. The laboratory sample container may be rotationally symmetric and this symmetry axis may be a vertical axis.

In one embodiment, the process control unit can further be adapted to determine a first (liquid) level of the laboratory sample in the laboratory sample container in response to the transmittance.

The laboratory sample container may contain the (liquid) laboratory sample and at least a second component such as, for example, air. The first (liquid) level may describe a vertical position in the laboratory sample container where the (liquid) laboratory sample ends and the second component begins. In other words, the first (liquid) level may describe a vertical position of a boundary layer between the (liquid) laboratory sample and the second component. Additionally, a transition phase may be located between the (liquid) laboratory sample and the second component. The transition phase may comprise a mixture of the (liquid) laboratory sample and the second component such as, for example, the mixture may be a bubble, several bubbles, foam or a film of a liquid or droplets. The first (liquid) level may be the vertical position of a boundary layer between the (liquid) laboratory sample and the transition phase.

The laboratory sample, the transition phase, if any, and the second component may differ in their transmittance and, thus, it may be possible to sense boundary layer(s) between the laboratory sample and the transition phase, if any, and the second component.

The process control unit can further be adapted to determine a second liquid level of the laboratory sample in response to the signal of the tip sensing unit. The liquid level detection based on the capacitance and/or pressure and/or resistance of/in the pipetting tip is known as capacitive/pressure/resistance Liquid Level Detection (c/p/rLLD), respectively. Reference is also made to the technical literature regarding the basic functional principles of LLD, e.g., U.S. Pat. No. 5,648,727 A. These LLD techniques are used to reliably control the movement of the pipetting tip relative to the sample surface, i.e., the liquid level. The pipetting tip can be moved towards the sample in the tube and can stop after detection of the liquid level by LLD and can be afterwards immersed into the sample with a defined fixed immersion depth. During pipetting of the sample, the pipetting tip can be further immersed into the sample to account for the drop of the liquid level during pipetting, i.e., suction of the sample into the pipetting tip.

With regard to the tip sensing unit, it may be impossible to distinguish between the laboratory sample and the transition phase by sensing the capacitance, resistance and/or pressure. Thus, the second level of the laboratory sample may describe a vertical position of a boundary layer between the transition phase and the second component, if a transition phase is present, or may describe a vertical position of a boundary layer between the laboratory sample and the second component, if no transition phase is present. If no transition phase is present, the first level and the second level are typically identical.

The process control unit may be adapted to cause or initiate a pipetting of the laboratory sample, if the first level and the second level differ less than a given threshold, and the process control unit may be adapted to cause a discarding of the laboratory sample, if the first level and the second level differ more than the given threshold. Discarding may denote that a pipetting step is omitted. Additionally, discarding may denote that that the laboratory sample is flagged by a defined flag and receives a specific treatment, e.g., the sample is positioned in an output area of the laboratory analyzer to be inspected by a laboratory assistant, assistant, or by automatically destroying the transition phase by e.g., sucking it out, slightly blowing in the sample container or other appropriate actions.

In one embodiment, the optical sensing unit can comprise a first light source emitting light having a first wavelength. The light having the first wavelength can be applied to the laboratory sample container and can then be transmitted through the laboratory sample container.

The light of the first light source may propagate as a beam through the laboratory sample container and the laboratory sample. The beam of the first light source may propagate substantially perpendicular to a vertical axis of the laboratory sample container, for example, at an angle relative to a vertical axis of the sample container of between about 85 degrees and about 95 degrees, such as between about 89 degrees and about 91 degrees. Further, the beam may propagate substantially through the vertical axis of the sample container.

The optical sensing unit may further comprise a first light detector adapted to detect light having the first wavelength transmitted through the laboratory sample container and adapted to generate a first light detector signal indicative of the transmittance through the laboratory sample container at the first wavelength.

The first wavelength may be substantially transmitted by the laboratory sample and the second component.

The optical sensing unit may comprise a second light source emitting light having a second wavelength. The light having the second wavelength can be applied to the laboratory sample container and can then be transmitted through the laboratory sample container.

The light of the second light source may propagate as a beam through the laboratory sample container and the laboratory sample. The beam of the second light source may propagate substantially perpendicular to a vertical axis of the laboratory sample container, for example, at an angle relative to a vertical axis of the sample container of between about 85 degrees and about 95 degrees, such as between about 89 degrees and about 91 degrees. Further, the beam may propagate substantially through the vertical axis of the sample container.

The optical sensing unit may further comprise a second light detector adapted to detect light having the second wavelength transmitted through the laboratory sample container and adapted to generate a second light detector signal indicative of the transmittance through the laboratory sample container at the second wavelength.

The second wavelength may be substantially absorbed by the laboratory sample and may be substantially transmitted by the second component.

The process control unit may be supplied with the first light detector signal and the second light detector signal and may be adapted to control the processing of the laboratory sample in response to the first and second light detector signal and the tip sensing signal.

The process control unit may be adapted to determine the first level in response to the first light detector signal and to the second light detector signal. The first light detector signal may be used as a reference signal, e.g., by calculating a quotient between the first light detector signal and the second light detector signal. Reference is made to EP 2 770 317 A1 regarding the use of two wavelengths for liquid level detection.

The process control unit may be supplied with the tip sensing signal for determining the second level.

In one embodiment, the first light source can emit light having a wavelength in the range between about 150 nm and about 1380 nm. In another embodiment, the first light source can emit light having a wavelength in the range between about 400 nm and about 1380 nm.

The wavelength of the first light source may have low water absorption.

The second light source can emit light having a wavelength in the range between about 1400 nm and about 4000 nm. In one embodiment, the second light source can emit light having a wavelength in the range between about 1400 nm and about 1600 nm. In another embodiment, the second light source can emit light having a wavelength in the range between about 1900 nm and about 2500 nm.

In one embodiment, the wavelengths for the second and first light source can be chosen such that the ratio of their absorption in water can be in the range between 2 and 1,000,000.

In one embodiment, a driving unit can be adapted to provide a vertical movement of the laboratory sample container relative to the optical sensing unit. The driving unit or a further driving unit can be adapted to provide a vertical movement of the laboratory sample container relative to the tip sensing unit, i.e., the (pipetting) tip can be moveable with respect to the laboratory sample container. The movement of the laboratory sample container may be in the direction of the vertical axis of the laboratory sample container.

The control unit can receive respective signals of the driving unit and/or of the further driving unit, if any, to relate the detected liquid level of the optical sensing unit and the detected liquid level of tip sensing unit. The driving unit may provide a respective movement signal or position signal to the process control unit indicating the respective relative vertical positions of the optical sensing unit and of the tip relative to the sample and/or sample container.

The two detected liquid levels can be related to each other by e.g., taking care that the sample container is always at the same level in space during operation or by detecting the sample container edge or a sample container holder edge by well-known techniques, e.g., a light barrier, or fixed touch probes or fixed distant measurement sensors like ultrasonic sensors.

In another embodiment, the driving unit and the further driving unit can be the same and e.g., can drive the sample container trough the optical sensing unit towards the pipetting tip.

The process control unit may be adapted to control the processing of the laboratory sample in response to the transmittance sensed by the optical sensing unit for different relative positions between the laboratory sample container and the optical sensing unit and in response to the tip sensing signal for different relative positions between the laboratory sample container and the tip.

In one embodiment, the driving unit can be adapted to rotate the laboratory sample container. The driving unit may rotate the laboratory sample container around a vertical axis of the laboratory sample container.

The process control unit may be adapted to control the processing of the laboratory sample in response to the transmittance and the signal of the tip sensing unit for the rotated laboratory sample container.

In one embodiment, the apparatus can comprise a light barrier adapted to detect the introduction of the laboratory sample container into the apparatus. The apparatus may be adapted to activate the optical sensing unit and/or the tip sensing unit and/or the process control unit when the introduction is detected. The deactivation of the optical sensing unit and/or of the tip sensing unit and/or the process control unit may initiate a standby mode for reducing energy consumption of the apparatus.

The laboratory automation system can be adapted to handle and/or process laboratory samples comprised in the laboratory sample container. The laboratory automation system can comprise the apparatus described above.

The laboratory automation system can further comprise a number (e.g., 1 to 100) of laboratory stations functionally coupled to the apparatus. The laboratory stations may e.g., be pre-analytical, analytical and/or post-analytical stations.

Pre-analytical stations may be adapted to perform any kind of pre-processing of samples, sample containers and/or sample container carriers.

Analytical stations may be adapted to use a sample or part of the sample and a reagent to generate a measuring signal, the measuring signal indicating if and in which concentration, if any, an analyte exists.

Post-analytical stations may be adapted to perform any kind of post-processing of samples, sample containers and/or or sample container carriers.

The pre-analytical, analytical and/or post-analytical stations may comprise at least one of a decapping station, a recapping station, an aliquot station, a centrifugation station, an archiving station, a pipetting station, a sorting station, a tube type identification station, a sample quality determining station, an add-on buffer station, a liquid level detection station, and a sealing/desealing station.

In one embodiment of the laboratory automation system, the laboratory automation system can comprise a laboratory pipetting station. The laboratory pipetting station can be controlled by the process control unit.

The laboratory pipetting station may be adapted to operate in response to the first level and/or the second level of the laboratory sample to securely and reliably perform the aspiration of the laboratory sample. The laboratory pipetting station may perform the aspiration of the laboratory sample at a specific vertical aspiration position depending on the first and/or second level.

The laboratory pipetting station may comprise the tip sensing unit.

In one embodiment at least one of the number of laboratory station can be adapted to analyze the laboratory sample.

The method for pipetting a laboratory sample contained in a laboratory sample container such as, for example, using the apparatus for processing a laboratory sample, can comprise sensing a transmittance through the laboratory sample container for a number (e.g., 1 to 100) of vertical positions, sequentially or simultaneously sensing a tip sensing signal in form of a capacitance, resistance and/or pressure of/in the tip depending on the vertical pipetting tip position relative to the sample, and pipetting the laboratory sample in response to the transmittance, the capacitance, resistance, and/or pressure.

Referring initially to FIG. 1, FIG. 1 schematically depicts an apparatus 100 for processing a laboratory sample 1 in form of liquid (such as blood) serum contained in a laboratory sample container 2.

In addition to the serum 1, the laboratory sample container 2 can further contain a second component 7 in the form of air and a transition phase 6 in the form of foam comprising a mixture of serum 1 and air 7. The serum 1, the transition phase 6 and the air 7 can be formed as separate layers inside the sample container 2.

The apparatus 100 can comprise an optical sensing unit 3 comprising a first light source 3a in the form of a laser diode emitting light having a first wavelength of about 800 nm.

Light having this wavelength can be respectively substantially transmitted by the material of the sample container 2, the serum 1, and the air 7.

The optical sensing unit 3 can further comprise a second light source 3c in the form of a laser diode emitting light having a second wavelength of about 1550 nm vertically spaced by a given vertical distance E. Light having the second wavelength can be respectively substantially transmitted by the material of the laboratory sample container 2, and the air 7, but blocked or absorbed by the serum 1.

The first light source 3a and the second light source 3c respectively can emit a light beam having a beam diameter of approximately 0.8 mm, such that the corresponding light beams propagate through the laboratory sample container 2 and the respective component or components along a substantially horizontal propagation path.

A first light detector 3b in the form of a photo diode can be arranged at a vertical level which can be the same as the vertical level of the first light source 3a. The light detector 3b can generate a first light detector signal LDS1 in response to a light power having the first wavelength applied to the light detector 3b. The first light detector signal LDS1 can be representative for a transmittance through the laboratory sample container 2 according to the first wavelength of the first light source 3a.

A second light detector 3d in the form of a photo diode can be arranged at a vertical level which can be the same as the vertical level of the second light source 3c. The light detector 3d can generate a second light detector signal LDS2 in response to a light power having the second wavelength applied to the light detector 3d. The second light detector signal LDS2 can be representative for a transmittance through the laboratory sample container 2 according to the second wavelength of the second light source 3c.

The apparatus 100 can further comprise a tip sensing unit 4 comprising a pipetting tip 11. A tip sensing signal tLDS provided by the tip sensing unit 4 can depend on the position of the pipetting tip 11 relative to the sample 1 because it can measure the capacitance of or the resistance of or the pressure in the pipetting tip 11. Thus, the tip sensing signal tLDS provided by the tip sensing unit 4 typically can depend on the liquid level of the serum 1 inside of the sample container 2. Consequently, the liquid level of the serum 1 can be determined based on the tip sensing signal tLDS. Reference is also made to the technical literature regarding the basic functional principles of Liquid Level Detection (LLD). Capacitive, resistance and/or pressure sensing can be used as a single measurement method or in any combination.

The pipetting tip 11 can be placed at an end of a conventional pipetting tube e.g., used to suck out a portion of the sample 1. Reference is made insofar to the relevant technical literature.

The apparatus 100 can further comprise a process control unit 5. The process control unit 5 can be adapted to control the processing of the serum 1 in response to the transmittance sensed by the optical sensing unit and the tip sensing signal tLDS, e.g., representing the capacitance of the pipetting tip 11.

The apparatus 100 can further comprise a driving unit 8 in the form of a pick-and-place unit for vertically moving the laboratory sample container 2 relative to the optical sensing unit 3 and the pipetting tip 11. The driving unit 8 can be further adapted to rotate the laboratory sample container 2 around a vertical axis V of the laboratory sample container 2. The driving unit 8 can be further adapted to insert the laboratory sample container 2 into a conventional laboratory sample container carrier 10. The driving unit 8 can be further adapted to generate a position signal z. The position signal z can represent a vertical position of the laboratory sample container 2.

The apparatus can further comprise a position sensing unit in the form of a light barrier 9. The light barrier 9 can be functionally coupled to the driving unit 8. The light barrier 9 can detect the introduction of the laboratory sample container 2 into the apparatus 100. The apparatus 100 can be adapted to activate the optical sensing unit 3 and/or the tip sensing unit 4 and/or the process control unit 5 when the introduction is detected. Moreover, the light barrier 9 can define a vertical position as a zero or reference position, i.e., a position signal z from the driving unit 8 for this reference position can have a defined reference value, e.g., zero. Thus, the driving unit 8 can output a position sensing signal z indicative of a vertical position of the laboratory sample container 2. The vertical position of the light barrier 9 can be defined as a vertical reference position.

The process control unit 5 can be supplied with the signals LDS1, LDS2 and z and can be adapted to determine a liquid level of the serum 1 in the laboratory sample container 2 in response to the first and second light detector signals LDS1, LDS2 as a first liquid level. Both light detector signals can be mapped to the bottom end of the laboratory sample container 2. The first and second light detector signals LDS1, LDS2 can be misaligned by z=E due to the vertical distance E between the first light source 3a and the second light source 3c.

Before analyzing the light detector signals LDS1 and LDS2, the process control unit 5 can match the first light detector signal LDS1 and the second light detector signal LDS2.

After matching the light detector sensing signals LDS1 and LDS2, the process control unit 5 can compute a liquid level out of the extinction and release of the signals LDS1 and the matched LDS2. A vertical position for which the result of the comparison changes can be determined as the first (liquid) level of the serum 1. For further details regarding this aspect, reference is made to EP 2 770 317 A1.

If labels are glued to the laboratory sample container 2 or other extinctive elements are present in the optical paths, the light detector sensing signals LDS1 and LDS2 may not have sufficient signal strength. In this case, the process control unit can compute a quotient Q (including signal smoothing, limiting, etc.) between the matched second light detector signal and the light detector signal LDS1. The quotient Q can be compared with a given threshold value. If this is still not sufficient, the driving unit 8 may rotate the laboratory sample container 2 around the vertical axis V of the laboratory sample container 2 to cause a measurement path eventually crossing a decreased number of label layers and may repeat the measurement. As such, a measurement path having less label layers may be found, thus increasing the signal-to-noise ratio of the sensing signals.

The process control unit 5 can be adapted to determine a level of the serum 1 in the laboratory sample container 2 in response to the tip sensing signal tLDS of the tip sensing unit 4 and the signal z as a second liquid level. For that purpose, the process control unit 5 can be functionally coupled to the tip sensing unit 4 such that the signal tLDS indicating the capacitance, resistance and/or pressure of/in the tip sensing unit 4 can be provided to the process control unit 5. The resistance, or capacitance of the tip 11 or the pressure in the tip 11 can also change when the tip 11 gets into contact with a liquid film, a droplet at the surface of the sample container 2, or foam above the proper liquid level. The principle of the determination of the second liquid level is known as capacitive/pressure/resistance Liquid Level Detection (c/p/rLLD). Reference is also made to the technical literature regarding the basic functional principles of LLD with tips.

In the discussed example of FIG. 1 the second liquid level and the first level can deviate from each other due to the presence of a transition phase 6 or e.g., an incorrect placement of the sample container in a sample container holder. The process control unit 5 can be adapted to determine a deviation, e.g., an absolute value of a difference, between the first and the second liquid level and can compare the deviation with a given threshold, e.g., about 3 mm. If the deviation is smaller than the given threshold, the process control unit 5 can cause a pipetting of the laboratory sample 1. If the deviation is larger or equal than the given threshold, the process control unit 5 can cause a discarding of the laboratory sample 1.

Figure 2:
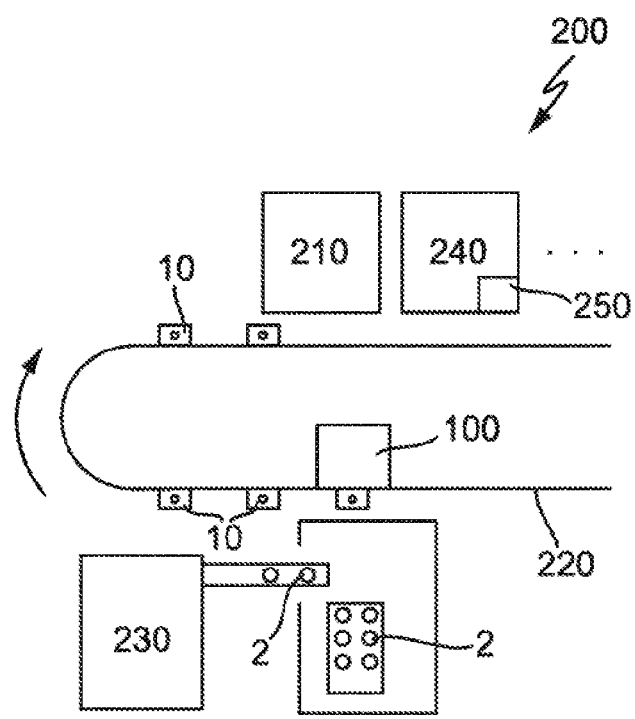
FIG. 2 illustrates schematically a laboratory automation system comprising the apparatus depicted in FIG. 1 according to an embodiment of the present disclosure.

FIG. 2 schematically illustrates a laboratory automation system 200 comprising the apparatus 100 depicted in FIG. 1, an exemplary laboratory station 210, a centrifuge station 230, an aliquoter unit 240 including a pipetting station 250.

The apparatus 100 and the pipetting station 250 can be functionally coupled by a conventional data or field bus. Self-evidently, the system may include further laboratory stations, such as pre analytical stations, analytical stations and post analytical stations.

The pipetting station 250 can transfer part of the sample 1 to one or more secondary tubes (not shown). The pipetting station 250 can be adapted to pipette the sample 1, if the process control unit 5 initiates the pipetting of the sample 1 in the event that the deviation between the two liquid levels is smaller than the given threshold. The pipetting station 250 can be adapted to discard the complete sample, i.e., to omit a pipetting step, if the process control unit 5 controls the discarding of the serum 1 in the event that the deviation between the two liquid levels is larger than or equal to the given threshold.

The system 200 can further include a sample container transport unit adapted to transport sample containers 2 between the apparatus 100, the pipetting station 250, and further laboratory stations, e.g., the laboratory station 210. The sample container transport unit can include a number of sample container carriers 10 and a conveyor 220. The sample container carriers 10 can be attached to the conveyor 220.

The optical sensing unit 3 and the tip sensing unit 4 may alternatively be provided at different locations of the laboratory automation system 200. The optical sensing unit 3 may e.g., be provided at a in-sort Station where the laboratory sample containers 2 comprising the corresponding samples can be inserted into the system 200. Thus, the first liquid level may be determined when inserting the sample container into the system 200. The tip sensing unit 4 may be functionally coupled to the aliquoter unit 240 such that the second liquid level may be determined before and/or during pipetting the laboratory sample 1.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. An apparatus for processing a laboratory sample contained in a laboratory sample container, the apparatus comprising:
    an optical sensing unit for sensing a transmittance at different vertical positions through the laboratory sample container;
    a tip sensing unit having a tip, wherein the tip sensing unit is configured to provide a tip sensing signal (tLDS) depending on a vertical position of the tip relative to the sample; and
    a process control unit configured to control the processing of the laboratory sample in response to the transmittance and the tip sensing signal (tLDS), wherein the process control unit is configured to determine a first level of the laboratory sample in the laboratory sample container in response to the transmittance and to determine a second level of the laboratory sample in response to the tip sensing signal (tLDS) and wherein the process control unit is configured to cause a pipetting of the laboratory sample if the first level and the second level differ less than a given threshold.

2. The apparatus according to claim 1, wherein the process control unit is-configured to cause a discarding and/or flagging of the laboratory sample if the first level and the second level differ more than the given threshold.

3. The apparatus according to claim 1, wherein the optical sensing unit comprises,
    a first light source emitting light having a first wavelength, wherein the light having the first wavelength is transmitted through the laboratory sample container,
    a first light detector configured to detect light having the first wavelength transmitted through the laboratory sample container and to generate a first light detector signal (LDS1) indicative of the transmittance through the laboratory sample container at the first wavelength,
    a second light source emitting light having a second wavelength, wherein the light having the second wavelength is transmitted through the laboratory sample container, and
    a second light detector configured to detect light having the second wavelength transmitted through the laboratory sample container and to generate a second light detector signal (LDS2) indicative of the transmittance through the laboratory sample container at the second wavelength, wherein the process control unit is supplied with the first light detector signal (LDS1) and the second light detector signal (LDS2) and is configured to control the processing of the laboratory sample in response to the first light detector signal (LDS1) and second light detector signal (LDS2) and the tip sensing signal (tLDS).

4. The apparatus according to claim 3, wherein the first light source emits light having a wavelength in the range between 150 nm and 1380 nm and the second light source emits light having a wavelength in the range between 1400 nm and 4000 nm.

5. The apparatus according to claim 1, further comprising,
a driving unit configured to vertically move the laboratory sample container relative to the optical sensing unit and the tip, wherein the process control unit is configured to control the processing of the laboratory sample in response to the transmittance and the tip sensing signal (tLDS) for different relative positions between the laboratory sample container and the optical sensing unit and for different relative positions between the laboratory sample container and the tip.

6. The apparatus according to claim 5, wherein the driving unit is configured to rotate the laboratory sample container, wherein the process control unit is configured to control the processing of the laboratory sample in response to the transmittance and the tip sensing signal (tLDS) for the rotated laboratory sample container.

7. The apparatus according to claim 1, further comprising,
a light barrier configured to detect the introduction of the laboratory sample container into the apparatus, wherein the apparatus is configured to activate the optical sensing unit and/or the tip sensing unit and/or the process control unit when the introduction is detected.

* * * * *